United States Patent

Zak

[11] Patent Number: 5,818,847
[45] Date of Patent: Oct. 6, 1998

[54] SYSTEM AND METHOD FOR PROVIDING REAL TIME VALUES IN DIGITAL DATA PROCESSING SYSTEM

[75] Inventor: Robert C. Zak, Lexington, Mass.

[73] Assignee: Sun Microsystems, Inc., Palo Alto, Calif.

[21] Appl. No.: 659,448

[22] Filed: Jun. 6, 1996

[51] Int. Cl.[6] ............................. G06F 11/00; H03K 21/00
[52] U.S. Cl. ............................ 371/5.1; 371/57.2; 377/39; 395/557
[58] Field of Search ............................ 371/5.1, 5.3, 5.4, 371/61, 62, 57.2, 47.1; 377/28, 39, 44, 45, 51, 114, 16, 20, 27, 33, 94, 96, 104; 327/48, 160, 291, 299; 364/183, 949.3, 950; 395/555, 556, 557, 558, 559

[56] References Cited

U.S. PATENT DOCUMENTS

| | | | |
|---|---|---|---|
| 3,866,024 | 2/1975 | Williams | 377/44 |
| 4,168,531 | 9/1979 | Zichelberger et al. | 395/557 |
| 4,989,223 | 1/1991 | Katayose et al. | 377/39 |
| 5,495,451 | 2/1996 | Cho | 365/221 |
| 5,657,361 | 8/1997 | Inagaki et al. | 377/39 |

*Primary Examiner*—Trinh L. Tu
*Attorney, Agent, or Firm*—Richard A. Jordan

[57] ABSTRACT

A programmable clock circuit generates a real time clock value, which is incremented in response to a real time clock increment signal. The real time clock increment signal is generated after a selected number of ticks of a system clock signal, with the number of ticks being determined by whether it is operating in a normal mode or an error compensation mode. In the normal mode, the real time clock increment signal is generated after a selected number of ticks of the system clock signal, which results in an increasing cumulative timing error. In the error compensation mode, the real time clock increment signal will be generated after a number of ticks of the system clock signal selected so as to reduce this cumulative error. The programmable clock circuit keeps track of the cumulative error in the real time clock signal while operating in the normal mode. When the cumulative error reaches a selected maximum error, the circuit changes to the error compensation mode to enable a reduction in the cumulative error in the real time clock signal.

36 Claims, 2 Drawing Sheets

FIG. 1

FIG. 2

SYSTEM AND METHOD FOR PROVIDING REAL TIME VALUES IN DIGITAL DATA PROCESSING SYSTEM

FIELD OF THE INVENTION

The invention relates generally to the field of digital data processing systems and circuits, and more particularly to clock circuits for generating timing values which indicate the passage of time. Specifically, the invention provides a programmable clock circuit and method for generating "real time clock" time values which are representative of passage of time.

BACKGROUND OF THE INVENTION

Many types of computer programs which may be processed by digital computer systems require information as to the actual time at which certain operations are performed. For example, in many cases, it is desirable to "time stamp" a particular item of data with a value representing the current actual time, or to otherwise determine the actual current time at which an operation is performed. Typically, digital computer systems maintain a "real time clock" circuit which provides a real time output value, in, for example, hours, minutes and seconds, and decimal fractions of seconds with selected granularities. Basically, a real time clock circuit is a counter which is incremented from some initial value in response to a timing signal. If the initial value is a function of the current real time at the point in time at which the real time clock circuit is initialized, the output of the real time clock circuit may be processed and used directly as the real time; however, if the real time clock circuit is initialized at a predetermined value, such as zero, the output of the real time clock circuit will generally be a function of the elapsed real time since the real time clock circuit was initialized, in which case the output can be combined with information as to the real time at which the real time clock circuit was initialized to provide the current real time.

As indicated above, a real time clock circuit increments in response to a timing signal. Generally, the timing signal which controls the real time clock circuit comprises the same timing signal which controls other operations of the digital computer. However, digital computer systems are being developed in which the timing signals which control the digital circuitry in the digital computer system operate at frequencies whose periodicities are not in decimal fractions of seconds. In such systems, an additional timing circuit could be used just to provide a suitable timing signal, but that would increase the cost of the system and would also require a separate connection to, for example, a processor which maintains the real time clock circuit. Instead of providing an additional timing circuit, the real time clock circuit can increment at the rate controlled by the timing signal, and when the real time clock value is needed, processing operations, often requiring multiplication or division operations, can be used, which processing operations can have relatively high processing overhead.

SUMMARY OF THE INVENTION

The invention provides a new and improved system and method for providing real time timing values in a digital data processing system.

In brief summary, the invention provides a programmable clock circuit including a real time clock counter, a system clock counter section, and a system clock cumulative error compensation section. The real time clock counter generates a real time clock value, and is incremented in response to a real time clock increment signal which is generated by the system clock counter section.

The system clock counter section counts the successive ticks of the system clock signal and generates the real time clock increment signal after a selected number of ticks, with the number of ticks being determined by whether it is operating in a normal mode or an error compensation mode.

In either mode, the system clock control section generates the real time clock increment signal, enabling the real time clock signal to increment after an integral number of ticks of the system clock signal. When the system clock control section is operating in the normal mode, it generates the real time clock increment signal after a number of ticks of the system clock signal corresponding to a selected normal rate, the normal rate being an integral number of ticks of the system clock signal but preferably near an optimum rate selected to minimize a timing error value. Each time the real time clock signal increments while the system clock control section is operating in the normal mode, a cumulative error corresponding to the difference between the time value as indicated by the real time clock and the actual time value will increase, and when the system clock counter section operates in the error compensation mode, the real time clock increment signal will be generated after a number of ticks of the system clock signal selected so as to reduce this cumulative error.

The system clock cumulative error compensation section controls the operational mode of the system clock control section, in particular, controlling when the system clock control section is operating in the normal mode and when it is operating in the error compensation mode. The system clock cumulative error compensation section effectively tracks the cumulative error in the real time clock signal while the system clock control section is operating in the normal mode. When the cumulative error reaches a point proximate to the predetermined maximum error, the system clock cumulative error compensation section enables the system clock control section to change to the error compensation mode to reduce the cumulative error in the real time clock signal.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
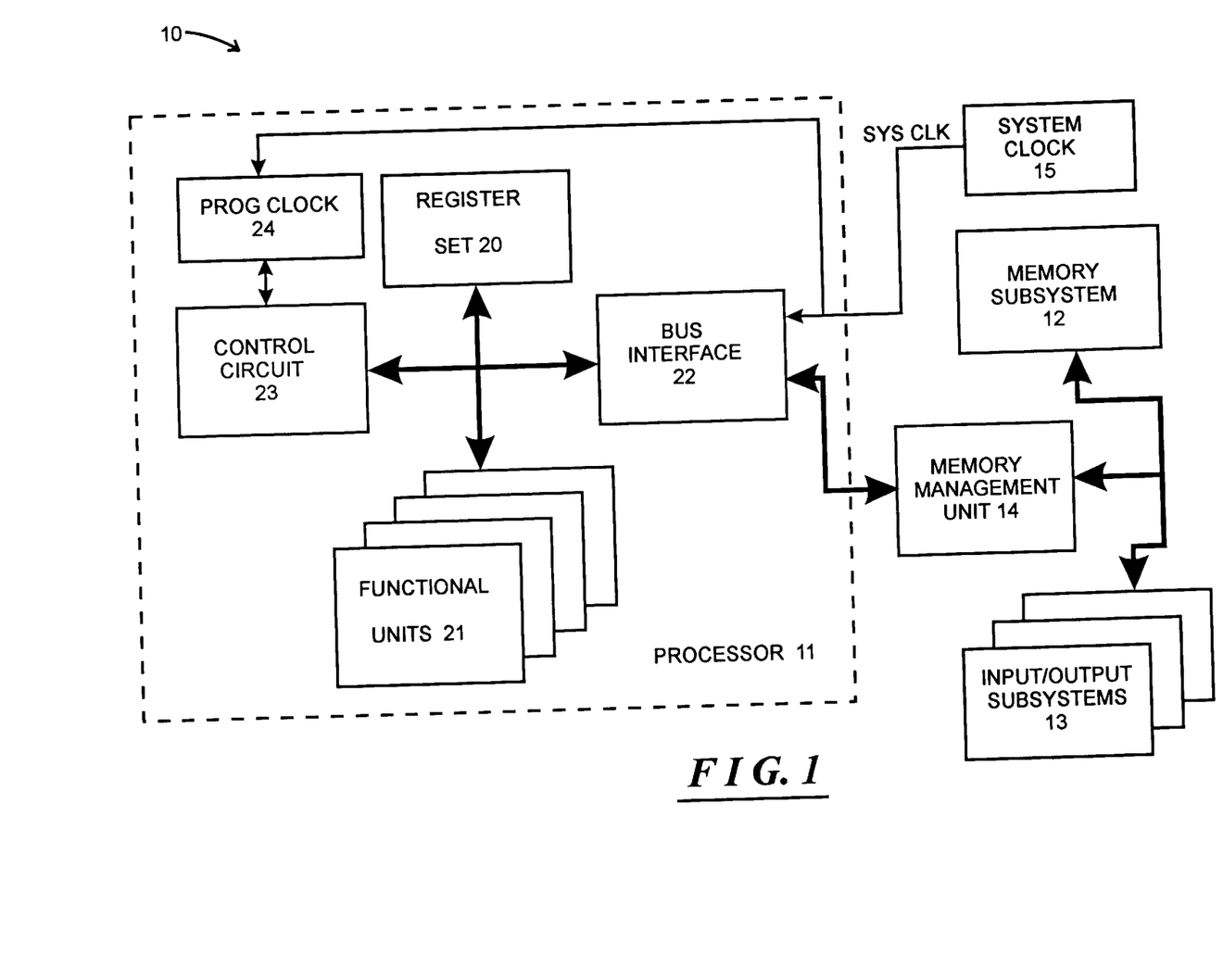
FIG. 1 is a representative digital computer system including a programmable clock circuit constructed in accordance with the invention.

FIG. 1 is a representative digital computer system 10 including a programmable clock circuit 24 constructed in accordance with the invention. With reference to FIG. 1, the digital computer system 10 includes a processor 11 which communicates with a memory subsystem 12 and one or more input/output subsystems generally identified by reference numeral 13 through a memory management unit 14. The processor 11 processes programs, including an operating system and one or more application programs all of which comprise instructions, in accordance with data, with the instructions and data (which collectively will be referred to herein as "information") being stored in the memory subsystem 12. Typically, the processor 11 will retrieve instructions and data from the memory subsystem 12 for processing, and will store processed data in the memory subsystem 12. The memory subsystem 12 includes a number of addressable storage locations in which information to be processed by the processor 11 may be stored, and in which the processor 11 may store the processed data. The processor 11 operates under control of a SYS CLK system clock signal which is provided by a system clock circuit 15. Other elements of the digital computer system 10 may also operate under control of the SYS CLK system clock signal.

The digital computer system 10 may include a number of diverse types of input/output subsystems 13, including mass storage subsystems, operator input and output subsystems, network ports and the like. The mass storage subsystems generally provide long-term storage for information which may be processed by the processor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the processor 11, information stored in the mass storage subsystems may be transferred to the memory subsystem 12 for storage. After the information is stored in the memory subsystem 12, the processor 11 may retrieve it from the memory subsystem 12 for processing. After the processed data is generated, the processor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mouse devices, which an operator may use to interactively input information to the digital computer system 10 for processing. In addition, the operator input subsystems may provide mechanisms whereby the operator may control the digital computer system 10. The operator output subsystems may include devices such as video display devices, through which the digital computer system 10, under control of the processor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The processor 11 may store information in the registers and other data storage elements, thereby to control the respective input/output subsystem 13, in a manner similar to the manner in which it stores information in the memory subsystem 12. Similarly, the processor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the processor 11 from the memory subsystem 12. In addition, as is typical, when the processor 11 requests information to be retrieved from, for example, the memory subsystem 12, or provides processed data for storage in, for example, the memory subsystem 12, the processor 11 will provide an address in a virtual address space to the memory management unit 14. The various application programs processed by the processor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the processor 11 enables individual ones of the pages to be copied to the memory subsystem 12 as they are needed during processing, and for those pages that are modified during processing the processor 11 may enable them to be copied to the mass storage subsystem for long-term storage.

Respective pages of a virtual address space may be compactly stored in physical locations in the memory subsystem 12, which are identified by physical addresses, and in performing an access operation in connection with a particular virtual address space location (that is, a retrieval of information from or a storage of information in a particular physical location) in response to a request from the processor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program has permission to access (that is, read data from or write data into) the page, and whether or not the requested page is a valid page in the virtual address space, and the like. If the memory management unit 14 makes a negative determination in the checking operation, that is, if it determines, for example, that the page is not in the memory subsystem 12, that the application program does not have the appropriate access permission, or if it determines that the requested page of the virtual address space page is not a valid page in the application program's virtual address space, it may generate an ACCESS FAULT indication, which the processor 11 may receive and use in performing selected fault handling operations.

In one embodiment, a microprocessor 11 useful in system 10 comprises a microprocessor constructed in accordance with the SPARC Version 9 architecture described in the SPARC International, Inc [David L. Weaver and Tom Germond (eds)], *The SPARC Architecture Manual Version 9* (Prentice-Hall, 1994). The processor 11 generally includes a number of elements, including a register set 20, one or more functional units 21, a bus interface 22, a control circuit 23 and a programmable clock circuit 24. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage. The operations performed by the processor 11, under control of the control circuit 23, are controlled by program instructions, which control the loading of data in the register set 20, the operations performed by the functional units 21 and the transfer of data from the register set 20 to the memory subsystem 12 or the input/output devices 13 for storage.

In accordance with the invention, the programmable clock circuit 24 generates a real time clock signal, which may be referenced by the program instructions in connection with processing controlled thereby. The programmable clock circuit 24 provides the real time clock RT CLK signal as a count value which the program can readily use to determine a real-time time value, which count value the programmable clock circuit 24 increments at a rate which can be controlled by the particular program. The programmable clock circuit 24 receives the system clock signal SYS CLK from the system clock circuit 15 and uses that SYS CLK signal, along with various parameters, to control the rate at which the real time clock RT CLK signal is incremented. In particular, the programmable clock circuit 24 normally increments the real time clock at a normal rate NR determined by $$NR = \left\lfloor \frac{SYS\ CLK}{RT\ CLK} \right\rfloor, \quad (1)$$

where "SYS CLK" and "RT CLK" in equation (1) refer to the clock rates of the system clock SYS CLK and real time clock RT CLK signals, respectively, and "$\lfloor x \rfloor$" refers to the greatest integer in "x." In this case, "$\lfloor x \rfloor$" corresponds to the quotient, or integer portion, of the result obtained by dividing the clock rate of the system clock SYS CLK signal by the clock rate of the real time RT CLK signal. Accordingly for every "NR" ticks of the system clock signal, the programmable clock circuit will increment the real time clock.

Incrementing the real time clock RT CLK signal at a normal rate determined in equation (1) will result in an error, which is related to the remainder portion of the result obtained by dividing the clock rate of the system clock SYS CLK signal by the clock rate of the real time RT CLK signal. Accordingly, the programmable clock circuit 24 maintains a record of the cumulative error which results over time, and, when the cumulative error reaches a selected error value, will increase the rate at which the real time clock RT CLK signal is incremented, for a selected number of ticks of the real time clock RT CLK signal, thereby to reduce the cumulative error. After the cumulative error has been reduced below the selected error value, the programmable clock circuit 24 can resume incrementing the real time clock RT CLK signal at the original "normal" rate.

Accordingly, the programmable clock circuit 24 effectively operates in two modes, namely, (i) a normal mode, in which the real time clock RT CLK signal is allowed to increment at the normal rate and the timing error is allowed to accumulate, and (ii) an error compensation mode, in which the real time clock RT CLK signal increments at a different rate which is selected to reduce the cumulative timing error.

Thus, the programmable clock circuit 24 increments the real time clock RT CLK signal at rates which effectively bound the timing error value between values which may be selected by parameters which may be provided by, for example, the control circuit under control of a particular program. Depending on the precision of the real time time values required by a particular program, and the precision of the real time time value represented by the real time clock RT CLK signal, the error value can be small enough that the error in the real time time value represented by the real time clock RT CLK signal will not adversely effect the operations of the particular program. It will be appreciated that, it in the normal mode, the real time clock RT CLK signal increments ahead of the point in time at which it should be incremented if there were to be no error (that is, if the period between the points in time at which the real time clock RT CLK signal is incremented is too short in the normal mode), which would be the case in connection with a normal rate NR set forth in equation (1), then the period of the real time clock RT CLK will be increased in the error compensation mode, with the increase in the period being selected to reduce the error in the real time clock RT CLK signal.

Figure 2:
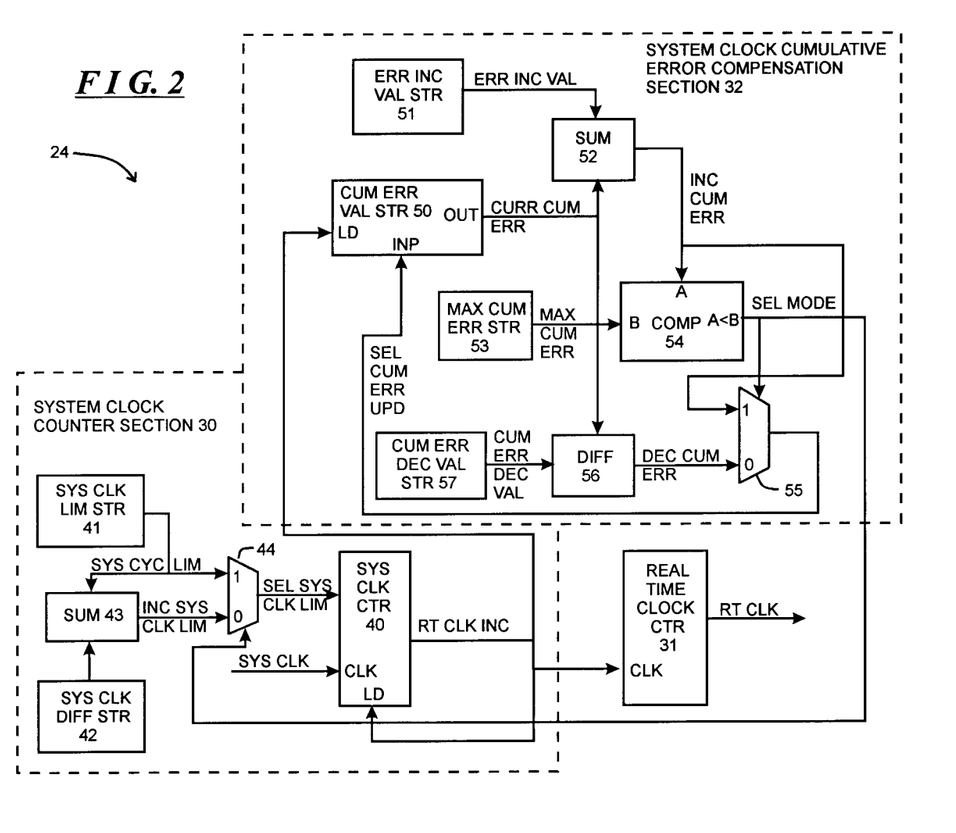
FIG. 2 is a function schematic block diagram of the programmable clock circuit depicted in FIG. 1.

FIG. 2 depicts a functional schematic diagram of the programmable clock circuit 24. With reference to FIG. 2, the programmable clock circuit 24 includes three general sections, including a system clock counter section 30, a real time clock counter 31 and a system clock cumulative error compensation section 32. Generally, the real time clock counter 31 generates the real time clock RT CLK signal described above. The real time clock RT CLK signal generated by the real time clock counter 31 may represent a value identifying a time increment since the programmable clock circuit 24 was last reset or initialized, if an initial value of, for example, zero is loaded into the counter 31. On the other hand, the real time clock RT CLK signal generated by the real time clock counter may represent a current time value, if an initial current time value is loaded original initialization value loaded into the counter 31 as an original initialization value. In any case, if the real time clock signal generated by the real time counter 31 represents a time increment since the programmable clock circuit 24 was last reset or initialized, a current time value may be generated by summing the value represented by the real time clock RT CLK signal with a base time value (not shown), which represents the time at which the programmable clock circuit 24 was last reset or initialized.

The real time clock counter 31 is incremented in response to a real time clock increment RT CLK INC signal which is generated by the system clock counter section 30. The system clock counter section 30, in turn, counts the successive ticks of the system clock SYS CLK signal and generates the real time clock increment RT CLK INC signal after a selected number of ticks, with the number of ticks being determined by whether the programmable clock circuit 24 is operating in the normal mode or the error compensation mode. When the programmable clock circuit 24 is operating in the normal mode, the system clock counter section 30 generates the real time clock increment RT CLK INC signal after a number of ticks of the SYS CLK system clock signal corresponding to the normal rate NR, as described above in connection with equation (1). As noted above, since the real time clock increment RT CLK INC signal is, in the normal mode, generated early, the real time clock RT CLK signal will be incremented early, providing an error, as described above.

On the other hand, when the programmable clock circuit 24 is operating in the error compensation mode, the system clock counter section 30 generates the real time clock increment RT CLK INC signal after a number of ticks of the system clock SYS CLK signal corresponding to the normal rate NR, increased by a predetermined "error compensation" number of ticks. The increase in the number of ticks of the system clock SYS CLK signal will delay generation of the real time clock increment RT CLK INC signal, in turn delaying the incrementation of the real time clock RT CLK signal, so as to reduce the error in the real time clock RT CLK signal.

The predetermined "error compensation" number of ticks is related to the desired bound in the desired maximum error in the real time clock RT CLK signal as described above. In one embodiment, the predetermined "error compensation" number of ticks is selected to be "one," so that, if the system clock counter section 30 in the normal mode generates the real time clock increment RT CLK INC signal after a number of ticks corresponding to the normal rate NR, in the error compensation mode it (that is, the system clock counter section 30) will generate the real time clock increment RT CLK INC signal after a number of ticks corresponding to "NR+1," which will generally bound the possible error in the real time clock RT CLK signal at the lowest error value.

The system clock cumulative error compensation section 32 controls the operational mode of the system clock control section 30, in particular, controlling when the system clock control section 30 is operating in the normal mode and when it is operating in the error compensation mode. The system clock cumulative error compensation section 32 effectively keeps track of the cumulative error that is reflected in the real time clock RT CLK signal while the system clock control section 30 is operating in the normal mode. When the error reaches a point at or near the desired maximum error, the system clock cumulative error compensation section 32 enables the system clock control section 30 to change to the error compensation mode. As indicated above, while the system clock control section 30 is operating in the normal mode, error in the real time clock RT CLK signal is allowed to accumulate and when the system clock cumulative error compensation section 32 enables the system clock control section 30 to switch to the error compensation mode, the error in the real time clock RT CLK signal is reduced. Thus, the system clock cumulative error compensation section 32 enables the programmable clock circuit 24 to effectively bound the error in the real time clock RT CLK signal, with the bound being determined by the amount of error which is permitted to accumulate while the system clock control section is operating in the normal mode.

More specifically, and with reference to FIG. 2, the system clock counter section 30 includes a system clock counter 40, a system clock limit store 41, a system clock difference store 42, a sum circuit 43 and a multiplexer 44. The system clock counter 40 generates the real time clock increment RT CLK INC signal which controls the incrementation by the real time clock counter 31 of the real time clock RT CLK signal. The system clock counter 40 receives a selected system clock limit SEL SYS CLK LIM signal from the multiplexer 44 which represents a value that corresponds to the number of ticks of the system clock SYS CLK signal from the system clock circuit 15 required between ticks of the real time clock RT CLK signal in the normal mode. After loading the value represented by the selected system clock limit SEL SYS CLK LIM signal, the system clock counter 40 will decrement in response to successive ticks of the system clock SYS CLK signal. When the value maintained by the system clock counter 40 has decremented to zero, it will assert the real time clock increment RT CLK INC signal. The real time clock increment RT CLK INC signal is coupled to the clock input terminal of the real time clock counter 31, and so the assertion of the real time clock increment RT CLK INC signal will enable the real time clock counter 31 to increment the value represented by the real time clock RT CLK signal.

In addition, the real time clock increment RT CLK INC signal generated by the system clock counter 40 is also coupled to the load input terminal of the system clock counter 40 and controls the loading of the counter 40. Thus, when the system clock counter 40 asserts the real time clock increment RT CLK INC signal, the system clock counter 40 will also load the value represented by the selected system clock limit SEL SYS CLK LIM signal, and thereafter decrement in response to the successive ticks of the system clock SYS CLK signal as described above. These operations will proceed through a number of iterations, with the system clock counter 40 in each iteration loading the value represented by the selected system clock limit SEL SYS CLK LIM signal provided by the multiplexer 44, decrementing in response to successive ticks of the system clock SYS CLK signal, and, when the count value maintained by the counter 40 has decremented to zero, asserting the real time clock increment RT CLK INC signal, thereby to enable (i) the real time clock counter 31 to increment, and
(ii) the system clock counter 40 to reload the value represented by the selected system clock limit SEL SYS CLK LIM signal.

It will be appreciated that the time period between assertions by the system clock counter 40 of the real time clock increment RT CLK INC signal will be controlled, in part, by the value represented by the selected system clock limit SEL SYS CLK LIM signal provided by multiplexer 44, as well as by the time period between ticks of the system clock SYS CLK signal provided by the system clock circuit 15 (FIG. 1). The multiplexer 44, in turn, selectively couples one of a system clock limit SYS CLK LIM signal or an incremented system clock limit DEC SYS CLK LIM signal as the selected system clock limit SEL SYS CLK LIM signal to the system clock counter 40, with the selection being made in response to a SEL MODE selected mode signal from the system clock cumulative error compensation section 32. As will be described below, the system clock cumulative error compensation section 32 will assert the SEL MODE selected mode signal to enable the system clock counter section 30 to operate in the normal mode, and otherwise will negate the SEL MODE selected mode signal thereby to enable the system clock counter section 30 to switch to operate in the error compensation mode. Accordingly, when the SEL MODE selected signal is asserted, which will occur during the normal mode, the multiplexer 44 will couple the system clock limit SYS CLK LIM signal from the store 41 to the data input terminals of the system clock counter 40. On the other hand, when the SEL MODE selected mode signal is negated, to enable the system clock counter section 30 to switch to the error compensation mode, the multiplexer 44 will couple the incremented system clock limit INC SYS CLK LIM signal to the system clock counter's data input terminals.

The system clock limit SYS CLK LIM signal is provided by the system clock limit store 41. The system clock limit store 41 stores a system clock limit value, which corresponds to the number of ticks of the system clock SYS CLK signal from the system clock circuit 15 which are required before the system clock control section 30, while operating in the normal mode, will assert the real time clock increment RT CLK INC signal to enable the real time clock counter 31 to increment the real time clock RT CLK signal. It will be appreciated that the system clock limit value is associated with the normal rate value NR described above in connection with equation (1). The SYS CLK LIM system clock limit signal provided by the system clock limit store 41 is representative of the system clock limit value stored in the store 41.

The incremented system clock limit INC SYS CLK LIM signal is provided by the sum circuit 43. The sum circuit 43 receives both the system clock limit SYS CLK LIM signal from the system clock limit store 41 and a system clock difference SYS CLK DIFF signal from the system clock difference store 42 and generates a incremented system clock limit INC SYS CLK LIM signal in response. The system clock difference store 42, in turn, stores a system clock difference value, which corresponds to the difference between (a) the number of ticks of the system clock SYS CLK signal which are required before the system clock control section 30, while operating in the normal mode, will enable the real time clock counter 31 to increment, and (b) the number of ticks of the system clock SYS CLK signal which are required before the system clock control section 30, while operating in the error compensation mode, will enable the real time clock counter 31 to increment.

The system clock difference store 42 provides a SYS CLK DIFF system clock difference signal which is representative of the system clock difference value stored therein. Thus, the incremented system clock limit INC SYS CLK LIM signal generated by the sum circuit 43 corresponds to the number of ticks of the system clock SYS CLK signal which are required before the system clock control section 30, while operating in the error compensation mode, will enable the real time clock counter 31 to increment. The incremented system clock limit INC SYS CLK LIM signal generated by the sum circuit 43 in response to the system clock limit SYS CLK LIM signal and the system clock difference SYS CLK DIFF signal will correspond to the number of ticks of the system clock SYS CLK signal which are required before the system clock control section 30, while operating in the error compensation mode, will enable the real time clock counter 31 to increment, as described above.

The system clock cumulative error compensation section 32 controls the condition of the MODE signal to, in turn, control the selection of the value which the system clock counter 40 loads, to determine whether programmable clock circuit 24 is operating in the normal mode or the error compensation mode. The system clock cumulative error compensation section 32 includes a cumulative error value store 50, an error increment value store 51, a sum circuit 52, a maximum cumulative error value store 53, a comparator 54, a multiplexer 55, a difference circuit 56 and a cumulative error decrement value store 57. The cumulative error value store 50 stores a cumulative error value, which is related to the cumulative error in the time value represented by the real time clock RT CLK signal, and provides a CURR CUM ERR current cumulative error signal representative of the cumulative error value. The error increment value store 51 stores an error increment value, which represents the amount of error which is added each time the value represented by the real time clock RT CLK signal is incremented, and provides an ERR INC VAL error increment value signal representative of the error increment value.

The sum circuit 52 receives both the current cumulative error CURR CUM ERR signal and the ERR INC VAL error increment value signal and generates an incremented cumulative error INC CUMM ERR signal, which represents a value corresponding to the sum of the current cumulative error value represented by the current cumulative error CURR CUM ERR signal and the ERR INC VAL error increment value signal. It will be appreciated that the value represented by the incremented cumulative error INC CUMM ERR signal corresponds to the value of the cumulative error that would be present in the real time clock RT CLK signal if the programmable clock circuit 24 increments the real time clock RT CLK signal in the normal mode. The incremented cumulative error INC CUM ERR signal is provided to one input of the multiplexer 55.

The cumulative error decrement value store 57 stores a value which corresponds to the reduction in error which would be present in the real time clock RT CLK signal if the programmable clock circuit 24 increments the real time clock RT CLK signal in the error compensation mode. The cumulative error decrement value store 57 provides a cumulative error decrement value CUM ERR DEC VAL signal representative of the value stored therein to one input of the difference circuit 56. The difference circuit 56 also receives the current cumulative error CURR CUM ERR signal from the cumulative error value store 50, and generates an output DEC CUM ERR decremented cumulative error signal which is representative of the difference between the value represented by the CURR CUM ERR current cumulative error signal from the store 50 and the CUM ERR DEC VAL cumulative error decrement value from the store 57. It will be appreciated that the value represented by the decremented cumulative error DEC CUM ERR signal from the difference circuit 56 corresponds to the amount of error that would be present in the real time clock RT CLK signal if the programmable clock circuit 24 increments the real time clock RT CLK signal in the error compensation mode. The decremented cumulative error DEC CUM ERR signal is provided to a second input of the multiplexer 55.

The multiplexer 55 receives both the incremented cumulative error INC CUM ERR signal and the DEC CUM ERR decremented cumulative error signal and selectively couples one of them as a SEL CUM ERR UPD selected cumulative error update signal to a data input terminal of the cumulative error value store 50. The multiplexer 55 is controlled by the selected mode SEL MODE signal, which is generated by the comparator 54. The comparator 54 receives the INC CUM ERR incremented cumulative error signal from the sum circuit 52 and a MAX CUM ERR maximum cumulative error signal from the maximum cumulative error store 53, compares values represented by the respective signals and generates the selected mode SEL MODE signal in response thereto. The maximum cumulative error MAX CUM ERR signal from the maximum cumulative error store 53 represents a value corresponding to the maximum cumulative error in the real time clock RT CLK signal which the system clock cumulative error compensation section 32 will allow to accumulate during the normal mode, before it will enable a switch to the error compensation mode. Thus, while the value represented by the INC CUM ERR incremented cumulative error signal from the sum circuit 52 represents a cumulative error value below the maximum cumulative error value represented by the maximum cumulative error MAX CUM ERR signal from the maximum cumulative error store, the comparator 54 will assert the selected mode SEL MODE signal, which enables the system clock counter section 30 to operate in the normal mode. On the other hand, if the value represented by the INC CUM ERR incremented cumulative error signal represents a cumulative error value equal to or greater than the maximum cumulative error value represented by the maximum cumulative error MAX CUM ERR signal, the comparator 54 will negate the selected mode SEL MODE signal, which enables the system clock counter section 30 to operate in the error compensation mode.

As noted above, the SEL MODE selected mode signal, in addition to controlling the system clock counter section 30, is also coupled to control the multiplexer 55. In particular, if the SEL MODE selected mode signal is asserted, which will be the case if the programmable clock circuit 24 is operating in the normal mode, the multiplexer 55 will be enabled to couple the incremented cumulative error INC CUM ERR signal to the cumulative error value store 50 as the SEL CUM ERR UPD selected cumulative error update signal which the store 50 will receive and store when the system clock counter section 30 next generates the real time clock increment RT CLK INC signal. It will be appreciated that, each time the system clock counter section 30 asserts the real time clock increment RT CLK INC signal in the normal mode, that signal will (i) enable the real time clock counter 31 to increment, and (ii) enable the cumulative error value store 50 to load a value corresponding to the incremented cumulative error INC CUM ERR signals, which, in turn, corresponds to the current cumulative error provided by the store 50 incremented by the error incrementation value from store 51 as represented by the error incrementation value ERR INC VAL signal.

Thus, while the programmable clock circuit is in the normal mode, the cumulative error value store will maintain a running total of the cumulative error in the real time clock RT CLK signal.

The comparator 54 will maintain the SEL MODE selected mode signal in the asserted condition, thereby maintaining the system clock counter section 30 in the normal mode, until it determines that the incremented cumulative error value represented by the INC CUM ERR incremented cumulative error signal is equal to or greater than the maximum cumulative error value as represented by the MAX CUM ERR signal from store 53. At that point, if the comparator 54 were to maintain the SEL MODE selected mode in the asserted condition (that is, if the programmable clock circuit 24 were maintained in the normal mode), in the next iteration the cumulative error in the real time clock RT CLK signal, as represented by the INC CUM ERR incremented cumulative error signal, would increase beyond the maximum cumulative error value as set forth in the maximum cumulative error store 53. Accordingly, the comparator 54 negates the SEL MODE signal, thereby enabling the programmable clock circuit 24 to switch to the error compensation mode.

As noted above, when the SEL MODE selected mode signal is negated, (i) the multiplexer 44 of the system clock counter section 30 couples the INC SYS CLK LIM incremented system clock limit signal as the SEL SYS CLK LIM selected system clock limit signal to the data input terminals of the system clock counter 40, and (ii) the multiplexer 55 of the system clock cumulative error compensation section 32 couples the DEC CUM ERR decremented cumulative error as the SEL CUM ERR UPD selected cumulative error update signal to the data input terminals of the cumulative error value store 50.

Accordingly, when the system clock counter 40 has next counted out and asserts the RT CLK INC real time clock increment signal:

(i) the system clock counter 40 will load the value represented by the INC SYS CLK LIM incremented system clock limit signal, and (ii) the cumulative error value store 50 will load the value represented by the DEC CUM ERR decremented cumulative error signal, thereby to place the programmable clock circuit 24 in the error compensation mode. After the system clock counter 40 loads the value represented by the INC SYS CLK LIM incremented system clock limit signal, it will decrement with each successive tick of the system clock signal from the system clock 15, as described above.

As indicated above, there are five parameters whose values control the operations of the programmable clock circuit 24, namely, (i) the system clock limit value stored in store 41, (ii) the system clock difference value stored in store 42, (iii) the error increment value stored in store 51, (iv) the maximum cumulative error value stored in store 53 and (v) the cumulative error decrement value stored in store 57. Some or all of these values may be variable, and may be provided to the programmable clock circuit 24 by the control circuit 23 of the processor 11, under control of programs executed thereby. Alternatively, if some or all values or fixed, they may be "wired in" to the programmable clock circuit 24.

A specific example will assist in illustrating how the particular values of the parameters which control the circuit 24 are determined. In this example, it will be assumed that the system clock circuit 15 provides the SYS CLK system clock signal at 83.30 MHz, and that the real time clock RT CLK signal is to be incremented at a rate of 2 MHz, that is, every 500 nanoseconds. The system clock limit value corresponds to $$SYS\ CLK\ LIM = \left\lfloor \frac{SYS\ CLK}{RT\ CLK} \right\rfloor, \qquad (2)$$

where, as above, "$\lfloor x \rfloor$" corresponds to the greatest integer in "x," which for this example corresponds to the value "41." As described above, this value identifies the number of ticks of the SYS CLK system clock signal required for one tick of the RT CLK real time clock signal. The error increment value defines the amount of error in the real time clock RT CLK signal each time that signal is incremented in the normal mode, which, in turn, corresponds to $$ERR\ INC\ VAL = \frac{SYS\ CLK - (SYS\ CLK\ LIM)(RT\ CLK)}{RT\ CLK}, \qquad (3)$$

which, for this example, corresponds to the value "0.65."

To minimize the cumulative error in the real time clock RT CLK signal, the system clock difference value, which identifies the difference in the number of ticks of the system clock SYS CLK signal required for each tick of the real time RT CLK signal in the normal and error compensation modes, is selected to have the value "1." In that case, in the error compensation mode, the real time clock RT CLK signal will be incremented after 42 ticks of the system clock SYS CLK signal, instead of 41 ticks, and so the reduction in error during the error compensation mode corresponds to the value $$ERR\ RED\ VAL = \frac{SYS\ CLK - (INC\ SYS\ CLK\ LIM)(RT\ CLK)}{RT\ CLK}, \qquad (4)$$

where "INC SYS CLK LIM" in equation (4) corresponds to the incremented system clock limit value provided by the sum circuit 43. The error reduction value ERR RED VAL in equation (4) provides a cumulative error decrement value for storage in store 57, which, in the current example, corresponds to the value "−0.35." The maximum cumulative error value stored in store 53 may be any convenient value, which in one embodiment is selected to have the value "one." As indicated above, the value selected for the maximum cumulative error value in part determines the bound in the error in the real time clock RT CLK signal generated by real time clock counter 31.

The programmable clock circuit 24 provides a number of advantages. In particular, it provides an arrangement for generating and incrementing a real time clock RT CLK signal which may be used by program without the necessity of performing multiplication or division operations, as is generally necessary in connection with current circuits for generating real time clock signals.

In addition, the programmable clock circuit 24 provides the real time clock RT CLK signal with a predetermined maximum degree of error in the real time time value provided by the real time clock RT CLK signal, which may result from a number of sources of error, including, for example, error in the timing of the SYS CLK system clock signal, error which can arise from the fact that each of the storage dements 41, 42, 51, 53 and 57 for storing parameter values comprises a finite number of bits, and so forth.

It will be appreciated that a number of modifications may be made to the programmable clock circuit 24 described herein. For example, although the programmable clock circuit 24 has been described as providing various storage elements 41, 42, 51, 53 and 57, which may comprise registers or the like, for storing various parameter values, it will be appreciated that "hard-wired" elements may be provided for providing parameters of fixed values. In addition, instead of providing a system clock difference value in store 42, and a sum circuit 43 to generate the INC SYS CLK LIM incremented system clock limit signal representing the incremented system clock limit value, the store 42 may store the incremented system clock limit value directly, in which case the sum circuit 43 can be eliminated.

In addition, while the programmable clock circuit 24 has been described as, during the normal mode, using a system clock limit value as set forth in equation (2) above, thereby enabling the system clock counter section 30 to assert the real time clock increment RT CLK INC signal ahead of the "zero error" incrementation time, which, in turn, enables the real time clock counter 31 to increment the value of the real time clock RT CLK signal at a rate which is faster that would be the case if no error were introduced in the signal, the system clock limit value may instead be selected at, for example $$SYS\ CLK\ LIM_d = \left\lfloor \frac{SYS\ CLK}{RT\ CLK} \right\rfloor + 1, \qquad (5)$$

which would enable the system clock counter section 30 to assert the real time clock increment RT CLK INC signal after the "zero error" incrementation time, which, in turn, would enable the real time clock counter 31 to increment the value of the real time clock RT CLK signal at a rate which is slower than would be the case if no error were introduced in the signal. In that case, the sum circuit 43 would be a difference circuit (or a value of minus-one could be provided as the system clock difference value in store 42), so that, during the error compensation mode, the real time clock counter 31 would be incremented at a faster rate selected to reduce the error accumulated during the normal mode. Generally, it will be appreciated that a variety of values may be selected as the system clock limit value, preferably integer values to facilitate use with the system clock counter 40. However, it will be appreciated that the further the system clock limit value deviates from the values defined by equations (2) or (5), the larger the error will be provided in the real time clock RT CLK signal for each tick of the SYS CLK system clock signal in the normal mode, and the larger the value which may be required for the system clock difference value for use during the error correction mode.

In addition, while the programmable clock circuit 24 has been described as forming part of a processor 11 having an organization depicted in FIG. 1, it will be appreciated that the programmable clock circuit may be used in connection with a number of processors having diverse structures and organizations. In addition, while the programmable clock circuit has been described as forming part of a processor 11 in a uni-processor system 10, the programmable clock circuit 24 may be used in a multi-processor system, either as part of one or more of the processors, or as a component separate and apart from any of the processors in the system. Furthermore, the programmable clock circuit may form part of a digital system which may not be controlled by a processor.

It will be appreciated that a system in accordance with the invention can be constructed in whole or in part from special purpose hardware or a general purpose computer system, or any combination thereof, any portion of which may be controlled by a suitable program, which may comprise one or more program code modules. In that case, a SYS CLK system clock signal "tick" may comprise, for example, any predetermined timing or clocking indication which may be used during processing of a program. Any such program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A clock circuit for generating a real time clock value in response to a system clock signal, the clock circuit comprising:

A. a real time clock counter configured to generate a real time clock value, the real time clock counter being incremented in response to a real time clock increment enable signal;

B. a system clock counter section configured to count a number of successive ticks of the system clock signal and generate the real time clock increment enable signal after a selected number of ticks, the system clock counter section operating in a normal mode and an error compensation mode, the system clock counter section (i) in the normal mode, being configured to generate the real time clock increment enable signal at a normal rate associated with a first predetermined number of successive ticks of the system clock signal, the normal rate being such that a cumulative timing error value will increase with successive generations of the real time clock increment enable signal, and (ii) in the error compensation mode, being configured to generate the real time clock increment enable signal in response to a second predetermined number of ticks of the system clock signal selected to reduce the cumulative timing error value; and C. a system clock cumulative error compensation section configured to track the cumulative timing error value in response to the real time clock increment enable signal, the system clock cumulative error compensation section being configured to enable the system clock counter section to operate in the normal mode unless the cumulative timing error value reaches a desired maximum timing error value, in response to which the system clock cumulative error compensation section enables the system clock counter section to change to the error compensation mode to reduce the cumulative timing error value.

2. A clock circuit as defined in claim 1 in which said system clock counter section comprises:

A. a system clock counter configured to receive said system clock signal and said real time clock increment enable signal, the system clock counter being configured to load a selected count value in response to the real time clock increment enable signal and, generate said real time clock increment enable signal in responsive to a number of ticks of said system clock signal after loading the selected count value; and B. a system clock value selector configured to respond to a mode select signal from said system clock cumulative error compensation section by selectively coupling a normal tick value corresponding to said first predetermined number of ticks or an error correction tick value corresponding to said second predetermined number of ticks to said system clock counter as said selected count value.

3. A clock circuit as defined in claim 2 in which said mode select signal is configured to enable said system clock value selector to couple the normal tick value to the system clock counter when the system clock cumulative error compensation section enables the system clock counter section to operate in said normal mode, and said error correction tick value to the system clock counter when the system clock cumulative error compensation section enables the system clock counter section to operate in said error compensation mode.

4. A clock circuit as defined in claim 2 in which the normal tick value is selected to allow said cumulative timing error value to increase while the system clock counter section is operating in the normal mode, and the error correction value is selected to decrease the cumulative error value while the system clock counter section is operating in the error compensation mode.

5. A clock circuit as defined in claim 2 in which said system clock value selector comprises:

A. a normal tick value store configured to store said normal tick value;

B. an error tick value generator configured to provide said error tick value; and C. a tick value selector configured to couple said normal tick value from said normal tick value store or said error tick value from said error tick value generator to said system clock counter as said selected count value in response to said mode select signal.

6. A clock circuit as defined in claim 5 in which said error tick value generator comprises:

A. a tick difference value store configured to store a difference value corresponding to the arithmetic difference between said normal tick value and said error tick value; and B. a difference value generator configured to generate said error tick value from the normal tick value provided by said normal tick value store and the difference value from said tick difference value store.

7. A clock circuit as defined in claim 1 in which said system clock cumulative error compensation section comprises:

A. a cumulative timing error value store configured to store said cumulative timing error value;

B. a maximum timing error store configured to store said maximum timing error value;

C. a cumulative timing error increment value generator configured to generate an incremented timing error value from the cumulative timing error value and a timing error increment value representative of an increment in timing error for the real time clock value while in the normal mode; and D. a mode selector configured to enable said system clock counter section to operate in the normal mode or the error compensation mode in response to the maximum timing error value from the maximum timing error store and the incremented timing error value from the cumulative timing error increment value generator, the mode selector being configured to enable the cumulative timing error value store to store the incremented timing error value when the real time clock increment enable signal is generated and the mode selector enables system clock counter section to operate in the normal mode.

8. A clock circuit as defined in claim 7 in which said mode selector comprises a comparator configured to compare the incremented timing error value and the maximum timing error value and for generating a mode signal in response, the mode signal enabling the enabling the system clock counter section to operate in the normal mode if the incremented timing error value is less than the maximum timing error value and in the error compensation mode if the incremented timing error value is greater than the maximum timing error value.

9. A clock circuit as defined in claim 7 in which said cumulative timing error increment value generator includes:
   A. a timing error increment value store configured to store said timing error increment value; and
   B. a sum value generator configured to generate the incremented timing error value as the sum of the cumulative timing error value and a timing error increment value.

10. A clock circuit as defined in claim 7 in which system clock cumulative error compensation section further includes a reduced cumulative timing error generator configured to generate a reduced cumulative timing error value from the cumulative timing error value and a timing error reduction value representative of a reduction in timing error for the real time clock value while in the error compensation mode, the mode selector being configured to enable the cumulative timing error value store to store the reduced cumulative timing error value when the real time clock increment enable signal is generated and the mode selector enables system clock counter section to operate in the error compensation mode.

11. A clock circuit as defined in claim 10 in which said reduced cumulative timing error generator includes:
   A. a timing error reduction value store configured to store said timing error reduction value; and
   B. a difference value generator configured to generate the reduced cumulative timing error value as the arithmetic difference between the cumulative timing error value and the timing error reduction value.

12. A method of generating a real time clock value in response to a system clock indication, the method comprising the steps of:
   A. counting a number of successive ticks of the system clock indication and generating a real time clock increment enable indication after a selected number of ticks, the system clock count being performed in a normal mode and an error compensation mode in which (i) in the normal mode, the real time clock increment enable indication being generated at a normal rate associated with a first predetermined number of successive ticks of the system clock indication, the normal rate being such that a cumulative timing error value will increase with successive generations of the real time clock increment enable indication, and (ii) in the error compensation mode, the real time clock increment enable indication being generated in response to a second predetermined number of ticks of the system clock indication selected to reduce the cumulative timing error value;
   B. tracking the cumulative timing error value in response to the generation of the real time clock increment enable indication and enabling the normal mode unless the cumulative timing error value reaches a desired maximum timing error value, in response to which the error compensation mode is enabled to reduce the cumulative timing error value; and
   C. incrementing the real time clock value in response to the real time clock increment enable indication.

13. A method as defined in claim 12 in which said system clock counting step includes the steps of:
   A. selecting a normal tick value corresponding to said first predetermined number of ticks or an error correction tick value corresponding to said second predetermined number of ticks to said system clock counter as a selected count value; and
   B. generating said real time clock increment indication in response to a number of ticks of said system clock indication corresponding to loading the selected count value.

14. A method as defined in claim 13 in which the normal tick value is used in the system clock counting step in said normal mode, and the error correction tick value is used in the system clock counting step in the error compensation mode.

15. A method as defined in claim 14 in which the normal tick value is selected to allow said cumulative timing error value to increase while the system clock counting step is operating in the normal mode, and the error correction value is selected to decrease the cumulative error value while the system clock counting step is operating in the error compensation mode.

16. A method as defined in claim 13 in which said selecting step comprises the steps of:
   A. storing said normal tick value;
   B. providing said error tick value; and
   C. selecting said normal stored tick value or said error tick value as said selected count value in response to the system clock counting step operating in said normal mode or said error compensation mode.

17. A method as defined in claim 16 in which selecting step comprises the steps of:
   A. storing a difference value corresponding to the arithmetic difference between said normal tick value and said error tick value; and
   B. generating said error tick value from the stored normal tick value and the stored difference value.

18. A method as defined in claim 12 in which said cumulative timing error value tracking step comprises the steps of:
   A. storing said cumulative timing error value;
   B. storing said maximum timing error value;
   C. generating an incremented timing error value from the cumulative timing error value and a timing error increment value representative of an increment in timing error for the real time clock value while in the normal mode; and
   D. enabling said system clock counting step to operate in the normal mode or the error compensation mode in response to the maximum timing error value and the incremented timing error value, the cumulative timing error value being stored when the real time clock increment enable indication is generated and the system clock counting step is operating in the normal mode.

19. A method as defined in claim 18 in which said selecting step includes the step of comparing the incremented timing error value and the maximum timing error value and for generating a mode indication in response, the mode indication enabling the system clock counting step to be operated in the normal mode if the incremented timing error value is less than the maximum timing error value and in the error compensation mode if the incremented timing error value is greater than the maximum timing error value.

20. A method as defined in claim 18 in which said generating step includes the steps of:
A. storing said timing error increment value; and
B. generating the incremented timing error value as the sum of the cumulative timing error value and a timing error increment value.

21. A method as defined in claim 18 in which cumulative timing error value tracking step further includes the step of generating a reduced cumulative timing error value from the cumulative timing error value and a timing error reduction value representative of a reduction in timing error for the real time clock value while in the error compensation mode, the reduced cumulative timing error value being stored as the timing error value when the real time clock increment enable indication is generated and the system clock count step being operated in the error compensation mode.

22. A method as defined in claim 21 in which said reduced cumulative timing error value generating step includes the steps of:
A. storing said timing error reduction value; and
B. generating the reduced cumulative timing error value as the arithmetic difference between the cumulative timing error value and the timing error reduction value.

23. A clock circuit computer program product for enabling a computer to generate a real time clock value in response to a system clock indication, the clock circuit computer program product comprising a computer-readable medium having encoded thereon:
A. real time clock counter code devices configured to enable the computer to generate a real time clock value, the real time clock counter code devices being configured to enable the incrementation of the real time clock value in response to a real time clock increment enable indication;
B. system clock counter code devices configured to enable the computer to count a number of successive ticks of the system clock indication and generate the real time clock increment enable indication after a selected number of ticks, the system clock counter code devices being configured to enable said computer to operate in a normal mode and an error compensation mode, (i) in the normal mode, to generate the real time clock increment enable indication at a normal rate associated with a first predetermined number of successive ticks of the system clock indication, the normal rate being such that a cumulative timing error value will increase with successive generations of the real time clock increment enable indication, and (ii) in the error compensation mode, to generate the real time clock increment enable indication in response to a second predetermined number of ticks of the system clock indication selected to reduce the cumulative timing error value; and
C. system clock cumulative error compensation code devices configured to enable the computer to track the cumulative timing error value in response to the real time clock increment enable indication, the system clock cumulative error compensation code devices being configured to enable the computer to operate in the normal mode unless the cumulative timing error value reaches a desired maximum timing error value, in response to which the system clock cumulative error compensation code devices are configured to enable the computer to change to the error compensation mode to reduce the cumulative timing error value.

24. A clock circuit computer program product as defined in claim 23 in which said system clock count code devices comprises:
A. counter code devices configured to enable said computer to receive said system clock indication and said real time clock increment enable indication, the counter code devices enabling the computer to load a selected count value in response to the real time clock increment enable indication and generate said real time clock increment enable indication in response to a number of ticks of said system clock indication after loading the selected count value; and
B. system clock value selection code devices configured to enable the computer to, in response to a mode select indication generated during processing of the system clock cumulative error compensation code devices, selectively couple a normal tick value corresponding to said first predetermined number of ticks or an error correction tick value corresponding to said second predetermined number of ticks as said selected count value.

25. A clock circuit computer program product as defined in claim 24 in which said mode select indication enables said computer, during processing of said system clock value selection code devices, to couple the normal tick value for use during processing of the system clock count code devices, when processing of the system clock cumulative error compensation code devices enabling the computer, while processing of the system clock count code devices, to operate in said normal mode, and said error correction tick value for use during processing of the system clock count code devices, when processing of the system clock cumulative error compensation code devices enabling the computer, while processing of the system clock count code devices, to operate in said error compensation mode.

26. A clock circuit computer program product as defined in claim 24 in which the normal tick value is selected to allow said cumulative timing error value to increase while the computer, while processing the system clock count code devices, is operating in the normal mode, and the error correction value is selected to enable a decrease the cumulative error value while the computer, while processing system clock count code devices, is operating in the error compensation mode.

27. A clock circuit computer program product as defined in claim 24 in which said system clock value selector code devices comprise:
A. normal tick value store code devices configured to enable said computer to store said normal tick value;
B. error tick value generator code devices configured to enable said computer to provide said error tick value; and
C. tick value selector code devices configured to enable said computer to couple said stored normal tick value or said error tick value as said selected count value in response to said mode select indication.

28. A clock circuit computer program product as defined in claim 27 in which said error tick value generator code devices comprise:
A. tick difference value store code devices configured to enable the computer to store a difference value corresponding to the arithmetic difference between said normal tick value and said error tick value; and B. difference value generator code devices configured to enable the computer to generate said error tick value from the stored normal tick value and the stored difference value.

29. A clock circuit computer program product as defined in claim 23 in which said system clock cumulative error compensation code devices comprise:
   A. cumulative timing error value store code devices configured to enable the computer to store said cumulative timing error value;
   B. maximum timing error store code devices configured to enable the computer to store said maximum timing error value;
   C. a cumulative timing error increment value generator code devices configured to enable the computer to generate an incremented timing error value from the cumulative timing error value and a timing error increment value representative of an increment in timing error for the real time clock value while in the normal mode; and
   D. mode selector code devices configured to enable said computer, while processing said system clock counter code devices, to operate in the normal mode or the error compensation mode in response to the stored maximum timing error value and the incremented timing error value, the mode selector code devices being configured to enable said computer, while processing the cumulative timing error value store code devices, to store the incremented timing error value when the real time clock increment enable indication is generated and the computer, while processing the system clock count code devices, is operating in the normal mode.

30. A clock circuit computer program product as defined in claim 29 in which said mode selector code devices comprise comparator code devices configured to enable the computer to compare the incremented timing error value and the maximum timing error value and generate a mode indication in response, the mode indication enabling the computer, while processing said system clock count code devices, to operate in the normal mode if the incremented timing error value is less than the maximum timing error value and in the error compensation mode if the incremented timing error value is greater than the maximum timing error value.

31. A clock circuit computer program product as defined in claim 29 in which said cumulative timing error increment value generator code devices include:
   A. timing error increment value store code devices configured to enable the computer to store said timing error increment value; and
   B. sum value generator code devices configured to enable the computer to generate the incremented timing error value as the sum of the cumulative timing error value and a timing error increment value.

32. A clock circuit computer program product as defined in claim 29 in which system clock cumulative error compensation code devices further includes reduced cumulative timing error generator code devices configured to enable said computer to generate a reduced cumulative timing error value from the cumulative timing error value and a timing error reduction value representative of a reduction in timing error for the real time clock value while in the error compensation mode, the mode selector code devices being configured to enable the computer to, while processing the cumulative timing error value store code devices, store the reduced cumulative timing error value when the real time clock increment enable indication is generated and the mode selector code devices enables the computer to process the system clock count code devices in the error compensation mode.

33. A clock circuit computer program product as defined in claim 32 in which said reduced cumulative timing error generator code devices include:
   A. timing error reduction value store code devices configured to enable the computer to store said timing error reduction value; and
   B. difference value generator code devices configured to enable the computer to generate the reduced cumulative timing error value as the arithmetic difference between the cumulative timing error value and the timing error reduction value.

34. A system for distributing code stored on a computer readable medium and executable by a computer, the code including a plurality of modules each configured to control the computer to facilitate the retrieval and loading of a stub for a remote method into an execution environment to facilitate invocation of the remote method by a program executing in said execution environment, said system comprising:
   A. real time clock counter code devices configured to enable the computer to generate a real time clock value, the real time clock counter code devices enabling the incrementation of the real time clock value in response to a real time clock increment enable indication;
   B. system clock counter code devices configured to enable the computer to count a number of successive ticks of a system clock indication and generate the real time clock increment enable indication after a selected number of ticks, the system clock counter code devices being configured to enable said computer to operate in a normal mode and an error compensation mode, (i) in the normal mode, to generate the real time clock increment enable indication at a normal rate associated with a first predetermined number of successive ticks of the system clock indication, the normal rate being such that a cumulative timing error value will increase with successive generations of the real time clock increment enable indication, and (ii) in the error compensation mode, to generate the real time clock increment enable indication in response to a second predetermined number of ticks of the system clock indication selected to reduce the cumulative timing error value; and
   C. system clock cumulative error compensation code devices configured to enable the computer to track the cumulative timing error value in response to the real time clock increment enable indication, the system clock cumulative error compensation code devices being configured to enable the computer to operate in the normal mode unless the cumulative timing error value reaches a desired maximum timing error value, in response to which the system clock cumulative error compensation code devices are configured to enable the computer to change to the error compensation mode to reduce the cumulative timing error value.

35. A real time clock value generating system for generating a real time clock value in response to a system clock indication, comprising:
   A. a computer, and
   B. a control arrangement comprising:
      i. real time clock counter code devices configured to enable the computer to generate a real time clock value, the real time clock counter code devices being configured to enable the incrementation of the real time clock value in response to a real time clock increment enable indication;

ii. system clock counter code devices configured to enable the computer to count a number of successive ticks of the system clock indication and generate the real time clock increment enable indication after a selected number of ticks, the system clock counter code devices being configured to enable said computer to operate in a normal mode and an error compensation mode, (i) in the normal mode, to generate the real time clock increment enable indication at a normal rate associated with a first predetermined number of successive ticks of the system clock indication, the normal rate being such that a cumulative timing error value will increase with successive generations of the real time clock increment enable indication, and (ii) in the error compensation mode, to generate the real time clock increment enable indication in response to a second predetermined number of ticks of the system clock indication selected to reduce the cumulative timing error value; and iii. system clock cumulative error compensation code devices configured to enable the computer to track the cumulative timing error value in response to the real time clock increment enable indication, the system clock cumulative error compensation code devices being configured to enable the computer to operate in the normal mode unless the cumulative timing error value reaches a desired maximum timing error value, in response to which the system clock cumulative error compensation code devices are configured to enable the computer to change to the error compensation mode to reduce the cumulative timing error value.

36. A control arrangement for use in connection with a computer to form a real time clock value generating system for generating a real time clock value in response to a system clock indication, the control arrangement comprising:

A. real time clock counter code devices configured to enable the computer to generate a real time clock value, the real time clock counter code devices being configured to enable the incrementation of the real time clock value in response to a real time clock increment enable indication;

B. system clock counter code devices configured to enable the computer to count a number of successive ticks of the system clock indication and generate the real time clock increment enable indication after a selected number of ticks, the system clock counter code devices being configured to enable said computer to operate in a normal mode and an error compensation mode, (i) in the normal mode, to generate the real time clock increment enable indication at a normal rate associated with a first predetermined number of successive ticks of the system clock indication, the normal rate being such that a cumulative timing error value will increase with successive generations of the real time clock increment enable indication, and (ii) in the error compensation mode, to generate the real time clock increment enable indication in response to a second predetermined number of ticks of the system clock indication selected to reduce the cumulative timing error value; and C. system clock cumulative error compensation code devices configured to enable the computer to track the cumulative timing error value in response to the real time clock increment enable indication, the system clock cumulative error compensation code devices being configured to enable the computer to operate in the normal mode unless the cumulative timing error value reaches a desired maximum timing error value, in response to which the system clock cumulative error compensation code devices are configured to enable the computer to change to the error compensation mode to reduce the cumulative timing error value.

* * * * *